(12) United States Patent
Reisacher et al.

(10) Patent No.: US 7,198,668 B2
(45) Date of Patent: Apr. 3, 2007

(54) PIGMENT GRANULES

(75) Inventors: Hansulrich Reisacher, Maxdorf (DE); Juan Antonio Gonzalez Gomez, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/501,328

(22) PCT Filed: Jan. 22, 2003

(86) PCT No.: PCT/EP03/00591

§ 371 (c)(1), (2), (4) Date: Jul. 22, 2004

(87) PCT Pub. No.: WO03/064540

PCT Pub. Date: Aug. 7, 2003

(65) Prior Publication Data

US 2005/0090609 A1  Apr. 28, 2005

(30) Foreign Application Priority Data

Feb. 1, 2002  (DE) .............. 102 04 304

(51) Int. Cl.
- *C08K 5/00* (2006.01)
- *C09D 11/00* (2006.01)
- *C04B 14/00* (2006.01)
- *C08J 5/14* (2006.01)
- *C08G 18/77* (2006.01)

(52) U.S. Cl. .............. 106/499; 106/31.6; 106/31.86; 106/31.89; 106/400; 523/150; 524/115; 524/156

(58) Field of Classification Search .............. 106/31.6, 106/31.86, 31.89, 400, 499; 523/160, 150; 524/115, 155, 156
See application file for complete search history.

(56) References Cited

U.S. PATENT DOCUMENTS

| | | | |
|---|---|---|---|
| 4,002,593 A * | 1/1977 | Jones | 523/318 |
| 4,056,402 A | 11/1977 | Guzi, Jr. | |
| 4,127,422 A | 11/1978 | Guzi, Jr. et al. | |
| 4,155,773 A * | 5/1979 | Ferrill, Jr. | 106/413 |
| 4,624,678 A | 11/1986 | Schneider | |
| 5,294,664 A * | 3/1994 | Morrison et al. | 524/560 |
| 5,585,189 A * | 12/1996 | Inoue et al. | 428/461 |
| 5,681,876 A * | 10/1997 | Schneider et al. | 523/351 |
| 6,110,266 A * | 8/2000 | Gonzalez-Blanco et al. | 106/31.65 |
| 6,436,178 B1 * | 8/2002 | Hosmer | 106/31.46 |
| 6,646,023 B1 * | 11/2003 | Nyssen | 523/122 |
| 2005/0080171 A1 | 4/2005 | Reisacher et al. | |
| 2005/0235876 A1 | 10/2005 | Reisacher et al. | |

FOREIGN PATENT DOCUMENTS

| | | |
|---|---|---|
| DE | 31 32 303 | 2/1983 |
| DE | 41 34 079 | 5/1992 |
| EP | 084 645 | 8/1983 |
| EP | 403 917 | 12/1990 |
| EP | 702 062 | 3/1996 |
| EP | 860 476 | 8/1998 |
| EP | 1 103 173 | 5/2001 |
| JP | 05-339514 | 12/1993 |

OTHER PUBLICATIONS

U.S. Appl. No. 10/501,343, Pigment Preparation.*
U.S. Appl. No. 10/534,298, filed May 9, 2005, Klopp et al.
U.S. Appl. No. 10/501,328, filed Jul. 22, 2004, Reisacher et al.
U.S. Appl. No. 10/501,343, filed Jul. 26, 2004, Reisacher et al.
U.S. Appl. No. 10/501,328, filed Jul. 22, 2004, Reisacher et al.
U.S. Appl. No. 10/515,345, filed Dec. 3, 2004, Reisacher et al.

* cited by examiner

*Primary Examiner*—J. A. Lorengo
*Assistant Examiner*—Patricia L. Hailey
(74) *Attorney, Agent, or Firm*—Oblon, Spivak, McClelland, Maier & Neustadt, P.C.

(57) ABSTRACT

Pigment granules having an average particle size from 50 to 5000 μm and a BET surface area $\leq 15$ m$^2$/g, including as essential constituents
 (A) from 60 to 90% by weight of at least one pigment and
 (B) from 10 to 40% by weight of at least one nonionic surface-active additive based on polyethers,
are prepared and used for pigmenting macromolecular organic and inorganic materials.

11 Claims, No Drawings

PIGMENT GRANULES

The present invention relates to novel pigment granules having an average particle size from 50 to 5000 μm and a BET surface area ≦5 m²/g, including as essential constituents
- (A) from 60 to 90% by weight of at least one pigment and
- (B) from 10 to 40% by weight of at least one nonionic surface-active additive based on polyethers.

The invention also relates to the production of these pigment granules and to their use for pigmenting macromolecular organic and inorganic materials.

Liquid systems such as coatings, varnishes, emulsion paints and printing inks are customarily colored using pigment formulations which include water, organic solvent or mixtures thereof. As well as anionic, cationic, nonionic or amphoteric dispersants, these pigment formulations generally have to be additized with further assistants, such as dried-crust inhibitors, freeze resistance enhancers, thickeners and anti-skinners, for stabilization.

There is a need for novel pigment preparations which are comparable to the liquid formulations with regard to color properties and dispersibility, but do not require the additions mentioned and are easier to handle. However, simply drying the liquid formulations does not provide solid pigment preparations having comparable application properties.

U.S. Pat. No. 4,056,402 and U.S. Pat. No. 4,127,422 describe dry nondusting pigment compositions for waterborne finish systems. However, these pigment compositions, as well as nonionic dispersants, include as an essential constituent at least 10% by weight of water-soluble cellulose ethers or of water-dispersible polyvinyl compounds and hence differ from the pigment granules of the present invention.

EP-A-84 645 and EP-A-403 917 disclose highly concentrated, solid pigment formulations for coloring aqueous, alcoholic and aqueous/alcoholic coatings and printing inks that include up to 30% by weight of an additive based on reaction products of at least bifunctional amines with propylene oxide and ethylene oxide but are present in finely divided form.

It is an object of the present invention to provide solid pigment preparations having altogether advantageous application properties, in particular high color strength and particularly good stir-in dispersibility in a wide variety of application media.

Pigment granules having an average particle size from 50 to 5000 μm and a BET surface area ≦15 m²/g, including as essential constituents
- (A) from 60 to 90% by weight of at least one pigment and
- (B) from 10 to 40% by weight of at least one nonionic surface-active additive based on polyethers.

The present invention further provides a process for preparing the pigment granules, which comprises wet-comminuting the pigment (A) in aqueous suspension in the presence of some or all of additive (B) and then spray granulating the suspension, if applicable after the rest of additive (B) has been added.

The present invention yet further provides a process for pigmenting macromolecular organic and inorganic materials, which comprises incorporating pigment granules into these materials by stirring or shaking.

The pigment granules of the present invention include as essential constituents a pigment (A) and a nonionic surface-active additive (B). They are free of thickeners, such as cellulose ethers, and film formers, such as polyvinyl acetates and alcohols.

The average particle size of the pigment granules according to the present invention is in the range from 50 to 5000 μm, and especially in the range from 100 to 1000 μm.

The BET surface area of the pigment granules according to the present invention is ≦15 m²/g, and preferably ≦10 m²/g.

Component (A) in the pigment granules of the present invention may be an organic pigment or an inorganic pigment. It will be appreciated that the pigment granules may also include mixtures of various organic or various inorganic pigments or mixtures of organic and inorganic pigments.

The pigments are present in finely divided form. Accordingly the pigments typically have average particle sizes from 0.1 to 5 μm.

The organic pigments are typically organic chromatic, white and black pigments (color pigments). Inorganic pigments can likewise be color pigments and also luster pigments and the inorganic pigments typically used as fillers.

There now follow examples of suitable organic color pigments:

monoazo pigments: C.I. Pigment Brown 25;
  C.I. Pigment Orange 5, 13, 36, 38, 64 and 67;
  C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247 and 251;
  C.I. Pigment Yellow 1, 3, 62, 65, 73, 74, 97, 120, 151, 154, 168, 181, 183 and 191;
  C.I. Pigment Violet 32;
disazo pigments: C.I. Pigment Orange 16, 34, 44 and 72;
  C.I. Pigment Yellow 12, 13, 14, 16, 17, 81, 83, 106, 113, 126, 127, 155, 174, 176 and 188;
disazo condensation C.I. Pigment Yellow 93, 95 and 128;
pigments: C.I. Pigment Red 144, 166, 214, 220, 221, 242 and 262;
  C.I. Pigment Brown 23 and 41;
anthanthrone pigments: C.I. Pigment Red 168;
anthraquinone pigments: C.I. Pigment Yellow 147, 177 and 199;
  C.I. Pigment Violet 31;
anthrapyrimidine
pigments: C.I. Pigment Yellow 108;
quinacridone pigments: C.I. Pigment Orange 48 and 49;
  C.I. Pigment Red 122, 202, 206 and 209;
  C.I. Pigment Violet 19;
quinophthalone pigments: C.I. Pigment Yellow 138;
diketopyrrolopyrrole
pigments: C.I. Pigment Orange 71, 73 and 81;
  C.I. Pigment Red 254, 255, 264, 270 and 272;
dioxazine pigments: C.I. Pigment Violet 23 and 37;
  C.I. Pigment Blue 80;
flavanthrone pigments: C.I. Pigment Yellow 24;
indanthrone pigments: C.I. Pigment Blue 60 and 64;
isoindoline pigments: C.I. Pigments Orange 61 and 69;
  C.I. Pigment Red 260;
  C.I. Pigment Yellow 139 and 185;
isoindolinone pigments: C.I. Pigment Yellow 109, 110 and 173;
isoviolanthrone pigments: C.I. Pigment Violet 31;
metal complex pigments: C.I. Pigment Red 257;
  C.I. Pigment Yellow 117, 129, 150, 153 and 177;
  C.I. Pigment Green 8;
perinone pigments: C.I. Pigment Orange 43;
  C.I. Pigment Red 194;

perylene pigments: C.I. Pigment Black 31 and 32;
C.I. Pigment Red 123, 149, 178, 179, 190 and 224;
C.I. Pigment Violet 29;
phthalocyanine pigments: C.I. Pigment Blue 15, 15:1, 15:2, 15:3, 15:4, 15:6 and 16;
C.I. Pigment Green 7 and 36;
pyranthrone pigments: C.I. Pigment Orange 51;
C.I. Pigment Red 216;
pyrazoloquinazolone
pigments: C.I. Pigment Orange 67;
C.I. Pigment Red 251;
thioindigo pigments: C.I. Pigment Red 88 and 181;
C.I. Pigment Violet 38;
triarylcarbonium
pigments: C.I. Pigment Blue 1, 61 and 62;
C.I. Pigment Green 1;
C.I. Pigment Red 81, 81:1 and 169;
C.I. Pigment Violet 1, 2, 3 and 27;
C.I. Pigment Black 1 (aniline black);
C.I. Pigment Yellow 101 (aldazine yellow);
C.I. Pigment Brown 22.
Examples of suitable inorganic color pigments are:
white pigments: titanium dioxide (C.I. Pigment White 6), zinc white, pigment grade zinc oxide; zinc sulfide, lithopone;
black pigments: iron oxide black (C.I. Pigment Black 11), iron manganese black, spinel black (C.I. Pigment Black 27); carbon black (C.I. Pigment Black 7);
chromatic pigments: chromium oxide, chromium oxide hydrate green; chrome green (C.I. Pigment Green 48); cobalt green (C.I. Pigment Green 50); ultramarine green;
cobalt blue (C.I. Pigment Blue 28 and 36; C.I. Pigment Blue 72); ultramarine blue; manganese blue;
ultramarine violet; cobalt violet;
manganese violet;
red iron oxide (C.I. Pigment Red 101); cadmium sulfoselenide (C.I. Pigment Red 108); cerium sulfide (C.I. Pigment Red 265); molybdate red (C.I. Pigment Red 104); ultramarine red;
brown iron oxide (C.I. Pigment Brown 6 and 7), mixed brown, spinel phases and corundum phases (C.I. Pigment Brown 29, 31, 33, 34, 35, 37, 39 and 40), chromium titanium yellow (C.I. Pigment Brown 24), chrome orange;
cerium sulfide (C.I. Pigment Orange 75); yellow iron oxide (C.I. Pigment Yellow 42); nickel titanium yellow (C.I.
Pigment Yellow 53; C.I. Pigment Yellow 157, 158, 159, 160, 161, 162, 163, 164 and 189); chromium titanium yellow;
spinel phases (C.I. Pigment Yellow 119);
cadmium sulfide and cadmium zinc sulfide (C.I. Pigment Yellow 37 and 35); chrome yellow (C.I. Pigment Yellow 34); bismuth vanadate (C.I. Pigment Yellow 184).
Examples of inorganic pigments typically used as fillers are transparent silicon dioxide, ground quartz, aluminum oxide, aluminum hydroxide, zinc sulfide, natural micas, natural and precipitated chalk and barium sulfate.

Luster pigments are platelet-shaped pigments having a monophasic or polyphasic construction whose color play is marked by the interplay of interference, reflection and absorption phenomena. Examples are aluminum platelets and aluminum, iron oxide and mica platelets bearing one or more coats, especially of metal oxides.

Component (B) in the pigment granules of the present invention is at least one nonionic surface-active additive based on polyethers.

As well as unmixed polyalkylene oxides, especially polyethylene oxides and polypropylene oxides, it is especially alkylene oxide block copolymers which are useful as component (B).

Copolymers comprising polypropylene oxide and polyethylene oxide blocks are very particularly suitable. They, like the unmixed polyalkylene oxides, can be obtained by polyaddition of these alkylene oxides to saturated or unsaturated aliphatic and aromatic alcohols and aliphatic amines, in which case these starter compounds are reacted with ethylene oxide first and then with propylene oxide or preferably with propylene oxide first and then with ethylene oxide.

Suitable aliphatic alcohols generally contain from 6 to 26 carbon atoms, preferably from 8 to 18 carbon atoms. Examples are octanol, nonanol, decanol, isodecanol, undecanol, dodecanol, 2-butyloctanol, tridecanol, isotridecanol, tetradecanol, pentadecanol, hexadecanol, 2-hexyldecanol, heptadecanol, octadecanol, 2-heptylundecanol, 2-octyldecanol, 2-nonyltridecanol, 2-decyltetradecanol, oleyl alcohol and 9-octadecenol and also mixtures of these alcohols such as $C_{13}/C_{15}$ and $C_{16}/C_{18}$ alcohols. Of particular interest are the fatty alcohols obtained from natural raw materials by fat hydrolysis and reduction and the synthetic fatty alcohols from the oxo process. The alkylene oxide adducts with these alcohols typically have average molecular weights $M_n$ from 400 to 2000.

Useful aromatic alcohols, besides α- and β-naphthol and $C_1$–$C_4$-alkyl derivatives thereof, include in particular phenol and its $C_1$–$C_{12}$-alkyl derivatives, such as hexylphenol, heptylphenol, octylphenol, nonylphenol, isononylphenol, undecylphenol, dodecylphenol, di- and tributylphenol and dinonylphenol.

Useful aliphatic amines correspond to the above-recited aliphatic alcohols.

As well as the alkylene oxide adducts with these monofunctional amines and alcohols it is the alkylene oxide adducts with at least bifunctional amines and alcohols which are of very particular interest.

The at least bifunctional amines preferably have from two to five amine groups and conform in particular to the formula $H_2N—(R—NR^1)_n—H$ (R: $C_2$–$C_6$-alkylene; $R^1$: hydrogen or $C_1$-$C_6$-alkyl; n: 1–5). Specific examples are: ethylenediamine, diethylenetriamine, triethylenetetramine, tetraethylenepentamine, 1,3-propylenediamine, dipropylenetriamine, 3-amino-1-ethyleneaminopropane, hexamethylenediamine, dihexamethylenetriamine, 1,6-bis(3-aminopropylamino)hexane and N-methyldipropylenetriamine, of which hexamethylenediamine and diethylenetriamine are more preferable and ethylenediamine is most preferable.

These amines are preferably reacted first with propylene oxide and then with ethylene oxide. The ethylene oxide content of the block copolymers is typically about 10–90% by weight.

The block copolymers based on polyamines generally have average molecular weights $M_n$ from 1000 to 40000 and preferably from 1500 to 30000.

The at least bifunctional alcohols preferably have from two to five hydroxyl groups. Examples are $C_2$–$C_6$-alkylene glycols and the corresponding di- and polyalkylene glycols, such as ethylene glycol, 1,2-propylene glycol, 1,3-propylene glycol, 1,2-butylene glycol, 1,4-butylene glycol, 1,6-hexylene glycol, dipropylene glycol and polyethylene glycol, glycerol and pentaerythritol, of which ethylene glycol and polyethylene glycol are more preferable and propylene glycol and dipropylene glycol are most preferable.

Particularly preferred alkylene oxide adducts with at least bifunctional alcohols have a central polypropylene oxide block, ie are based on a propylene glycol or polypropylene glycol which is initially reacted with further propylene oxide and then with ethylene oxide. The ethylene oxide content of the block copolymers is typically in the range from 10 to 90% by weight.

The block copolymers based on polyhydric alcohols generally have average molecular weights $M_n$ from 1000 to 20000 and preferably from 1000 to 15000.

Such alkylene oxide block copolymers are known and commercially available, for example under the names Tetronic® and Pluronic® (BASF).

Alkylene oxide block copolymers (B) are selected with different hydrophilic-lipophilic balance (HLB) values, depending on the application medium in which the pigment granules of the present invention are to be used.

For use in aqueous, aqueous/alcoholic and alcoholic systems, preference is given to alkylene oxide block copolymers (B) having HLB values of about a $\geq 10$, which corresponds to an ethylene oxide content of the copolymers of generally $\geq 25\%$ by weight.

For use of the pigment granules of the present invention in hydrocarbonaceous, eg mineral oil containing or xylenic systems or systems based on nitrocellulose, alkylene oxide block copolymers (B) having HLB values of about <10 are particularly suitable, this HLB value corresponding to an ethylene oxide content of the copolymers of generally <25% by weight.

The pigment granules of the present invention include from 60 to 90% by weight and preferably from 70 to 85% by weight of component (A) and from 10 to 40% by weight and preferably from 10 to 30% by weight of component (B).

They are advantageously obtainable by the process of the invention by wet-comminuting the pigment (A) in aqueous suspension in the presence of some or all of the nonionic additive (B) and then spray granulating the suspension, if applicable after the rest of additive (B) has been added.

Pigment (A) can be used in the process of the present invention as a dry powder or in the form of a presscake.

Pigment (A) as used is a finished product, ie the primary particle size of the pigment has already been adjusted to the desired application value. This finish is necessary in the case of organic pigments especially, since the as-synthesized crude material is not suitable for use. In the case of inorganic pigments, for example in the case of oxide and bismuth vanadate pigments, the primary particle size may also be adjusted in the course of the synthesis of the pigment, so that the as-synthesized pigment suspensions can be used direct in the process of the present invention.

Since the finished pigment (A) typically reagglomerates in the course of drying or on the filter assembly, it is subjected to wet comminution, for example grinding in a stirred media mill, in aqueous suspension.

The wet comminution should be carried out in the presence of at least a portion of the additive (B) for the ready-produced pigment granules, and it is preferable to add the entire amount of additive (B) prior to the wet comminution.

Spray granulation is preferably carried out in a spray tower using a one-material nozzle. Here, the suspension is sprayed in the form of relatively large drops, and the water evaporates. Additive (B) melts at the drying temperatures and so leads to the formation of a substantially spherical granule having a particularly smooth surface.

The gas inlet temperature in the spray tower is generally in the range from 180 to 300° C. and preferably in the range from 150 to 300° C. The gas outlet temperature is generally in the range from 70 to 150° C. and preferably in the range from 70 to 130° C.

The residual moisture content of the granular pigment obtained is generally <2% by weight.

The pigment granules of the present invention are notable in use for their excellent color properties which are comparable to those of liquid pigment formulations, especially with regard to color strength, brilliance, hue and hiding power, and especially for their stir-in characteristics, ie they can be dispersed in application media with a minimal input of energy, simply by stirring or shaking.

Compared with liquid pigment formulations, the pigment granules of the present invention additionally have the following advantages: They have a higher pigment content. Whereas liquid formulations tend to change viscosity in the course of storage, and have to be admixed with preservatives and agents for enhancing the resistance to freezing and/or drying out, the pigment granules of the present invention exhibit very good stability in storage. They are both economically and ecologically advantageous with regard to packaging, storage and transportation. Since they are solvent free, they are more flexible in use.

The pigment granules of the present invention are notable for excellent attrition resistance, a minimal tendency to compact or clump, uniform particle size distribution, good pourability, flowability and meterability, and also dustlessness in handling and application.

The pigment granules of the present invention are very useful for pigmenting macromolecular organic and inorganic materials of any kind. Liquid application media in this context can be purely aqueous, comprise mixtures of water and organic solvents, for example alcohols, or be based exclusively on organic solvents, such as alcohols, glycol ethers, ketones, eg methyl ethyl ketone, amides, eg N-methylpyrrolidone and dimethylformamide, esters, eg ethyl acetate, butyl acetate and methoxypropyl acetate, or aromatic or aliphatic hydrocarbons, eg xylene, mineral oil and mineral spirits.

When the HLB value of the additive (B) included in the pigment granules of the present invention has not been adapted to the character of the application medium, as described above, the granules can initially be stirred into a solvent which is compatible with the particular application medium, and this stirring into the solvent is again possible with minimal input of energy, and then be introduced into this application medium. For instance, slurries of pigment granules having high HLB values in glycols or other solvents customary in the paint and coatings industry, such as methoxypropyl acetate, can be used to render the pigment granules compatible with hydrocarbonaceous systems or systems based on nitrocellulose.

Examples of materials which can be pigmented with the pigment granules of the present invention include: coatings, for example architectural coatings, industrial coatings, automotive coatings, radiation-curable coatings; paints, including paints for building exteriors and building interiors, for example wood paints, lime washes, distempers, emulsion paints; solventborne printing inks, for example offset printing inks, flexographic printing inks, toluene intaglio printing inks, textile printing inks, radiation-curable printing inks; waterborne inks, including inkjet inks; color filters; building materials (water is typically added only after building material and granular pigment have been dry mixed), for example silicate render systems, cement, concrete, mortar, gypsum; bitumen, caulks; cellulosic materials, for example paper, paperboard, cardboard, wood and woodbase, which can each be coated or otherwise finished; adhesives; film-forming polymeric protective colloids as used for example in the pharmaceutical industry; cosmetic articles; detergents.

EXAMPLES

Production and Testing of Pigment Granules According to Invention

The pigment granules were produced by ball milling a suspension of 20 kg (Example 1: 35 kg) of additive (B) and 80 kg of finished pigment (A) to a $d_{50}$ value of 0.8 μm, and then spray granulating the mixture in a spray tower using a one-material nozzle (gas inlet temperature 170° C., gas outlet temperature 80° C.).

The color strength of the pigment granules was determined colorimetrically in the white reduction (reported in terms of the DIN 55986 coloring equivalents (CE)) in a waterborne emulsion paint. To this end, a mixture of in each case 1.25 g of granular pigment and 50 g of a waterborne styrene-acrylate-based test binder having a white pigment content of 16.4% by weight ($TiO_2$, Kronos 2043) (BASF test binder 00-1067) was homogenized in a 150 ml plastic beaker by running a high speed stirrer at 1500 rpm for 3 min. The color obtained was then drawn down on a black and white test card using a 100 μm wire-wound film applicator and dried for 30 min.

The corresponding emulsion paints produced using commercially available aqueous formulations of the pigments were assigned the CE value of 100 standard. CE values <100 mean a higher color strength than that of the standard, CE values >100 accordingly a lower color strength.

The table hereinbelow lists details of the pigment granules produced (composition, $d_{50}$ median average particle size, BET surface area) and also the respectively obtained CE values. The nonionic additives (B) used were as follows:

B1: block copolymer based on ethylenediamine/propylene oxide/ethylene oxide, having an ethylene oxide content of 40% by weight and an average molecular weight $M_n$ of 12000

B2: block copolymer based on ethylenediamine/propylene oxide/ethylene oxide, having an ethylene oxide content of 40% by weight and an average molecular weight $M_n$ of 6700

B3: propylene oxide/ethylene oxide block copolymer having a central polypropylene oxide block, an ethylene oxide content of 50% by weight and an average molecular weight $M_n$ of 6500

TABLE

| Ex. | Pigment (A) | Additive (B) | $d_{50}$ [μm] | BET [m²/g] | CE |
|---|---|---|---|---|---|
| 1 | C.I. P. Y. 42 | B1 | 330 | 4 | 110 |
| 2 | C.I. P. Y. 74 | B3 | 270 | 2 | 108 |
| 3 | C.I. P. Y. 138 | B3 | 280 | 1 | 105 |
| 4 | C.I. P. Y. 184 | B1 | 300 | 1 | 105 |
| 5 | C.I. P. R. 101 | B1 | 320 | 4 | 107 |
| 6 | C.I. P. R. 112 | B1 | 330 | 1 | 106 |
| 7 | C.I. P. R. 122 | B1 | 280 | 2 | 106 |
| 8 | C.I. P. V. 19 | B1 | 270 | 1 | 108 |
| 9 | C.I. P. V. 23 | B1 | 290 | 1 | 108 |
| 10 | C.I. P. B. 15:2 | B2 | 300 | 3 | 109 |
| 11 | C.I. P. B. 15:3 | B1 | 300 | 8 | 105 |

TABLE-continued

| Ex. | Pigment (A) | Additive (B) | $d_{50}$ [μm] | BET [m²/g] | CE |
|---|---|---|---|---|---|
| 12 | C.I. P. G. 7 | B1 | 280 | 1 | 107 |
| 13 | C.I. P. Bk. 7 | B1 | 310 | 5 | 108 |

We claim:

1. Pigment granules having an average particle size from 50 to 5000 μm and a BET surface area $\leq 15$ m²/g, consisting of
   (A) from 60 to 90% by weight of at least one pigment and
   (B) from 10 to 40% by weight of at least one nonionic surface-active additive based on polyethers, wherein said component (B) comprises ethylene oxide- or propylene oxide- or mixed ethylene oxide/propylene oxide-adducts with amines or alcohols, or ethylene oxide/propylene oxide block copolymers,
obtained by wet-comminution of said pigment (A) in aqueous suspension in the presence of some or all of said additive (B) and subsequent spray granulation of said suspension, if applicable after the rest of additive (B) has been added.

2. Pigment granules as claimed in claim 1, wherein said component (B) comprises block copolymers obtained by sequential polyaddition of propylene oxide and ethylene oxide to at least bifunctional amines or alcohols.

3. A process for producing pigment granules as claimed in claim 1, which comprises wet-comminuting said pigment (A) in aqueous suspension in the presence of some or all of said additive (B) and then spray granulating said suspension, if applicable after the rest of additive (B) has been added.

4. A process as claimed in claim 3, wherein said spray granulating is effected in a spray tower using a one-material nozzle.

5. A process for pigmenting macromolecular organic or inorganic materials, which comprises incorporating pigment granules as claimed in claim 1 into these materials by stirring or shaking.

6. A process as claimed in claim 5, wherein said macromolecular organic or inorganic materials are pigmenting coatings, paints, inks, building materials or cellulosic systems, where a liquid phase comprises water, organic solvents or mixtures of water and organic solvents.

7. Pigment granules as claimed in claim 1, wherein the average particle size is from 100 to 1,000 μm and the BET surface area is $\leq 10$ m²/g.

8. Pigment granules as claimed in claim 1, wherein component (B) is at least one selected from the group consisting of ethylenediamine/polypropylene oxide/ethylene oxide block copolymers, ethylene oxide/polypropylene oxide/ethylene oxide block copolymers, and ethylene oxide adducts with fatty alcohols.

9. Pigment granules as claimed in claim 8, wherein component (B) comprises an ethylenediamine/polypropylene oxide/ethylene oxide block copolymer.

10. Pigment granules as claimed in claim 8, wherein component (B) comprises an ethylene oxide/polypropylene oxide/ethylene oxide block copolymer.

11. Pigment granules as claimed in claim 8, wherein component (B) comprises an ethylene oxide adduct with a fatty alcohol.

* * * * *